United States Patent
Burnside et al.

(10) Patent No.: US 8,395,508 B2
(45) Date of Patent: Mar. 12, 2013

(54) RFID TAG MONITORING SYSTEM

(75) Inventors: Walter D. Burnside, Dublin, OH (US);
Kai-Hong Cheng, Zhubei (TW); Yumin Shane Ho, Zhonghe (TW)

(73) Assignees: Wistron NeWeb Corporation, Hsinchu (TW); DJB Group LLC, Dublin, OH (US)

( * ) Notice: Subject to any disclaimer, the term of this patent is extended or adjusted under 35 U.S.C. 154(b) by 442 days.

(21) Appl. No.: 12/756,210

(22) Filed: Apr. 8, 2010

(65) Prior Publication Data

US 2011/0068925 A1     Mar. 24, 2011

Related U.S. Application Data

(60) Provisional application No. 61/244,951, filed on Sep. 23, 2009.

(51) Int. Cl.
*G08B 13/14* (2006.01)

(52) U.S. Cl. .................. 340/572.7; 340/568.1; 340/10.1

(58) Field of Classification Search ............... 340/572.7, 340/572.1–572.6, 572.8–572.9, 539.1, 568.1, 340/10.1, 10.4
See application file for complete search history.

(56) References Cited

U.S. PATENT DOCUMENTS

| | | | | |
|---|---|---|---|---|
| 6,137,422 A * | 10/2000 | Hahn et al. | | 340/10.1 |
| 6,342,839 B1 * | 1/2002 | Curkendall et al. | | 340/573.3 |
| 6,616,047 B2 * | 9/2003 | Catan | | 235/472.02 |
| 2006/0022801 A1 * | 2/2006 | Husak et al. | | 340/10.5 |
| 2006/0238307 A1 * | 10/2006 | Bauer et al. | | 340/10.1 |
| 2007/0075834 A1 * | 4/2007 | Armstrong et al. | | 340/10.1 |
| 2007/0126585 A1 * | 6/2007 | Okunev et al. | | 340/572.7 |
| 2008/0094214 A1 * | 4/2008 | Azevedo et al. | | 340/568.1 |
| 2009/0219144 A1 * | 9/2009 | Pettus | | 340/10.4 |

FOREIGN PATENT DOCUMENTS

| | | |
|---|---|---|
| JP | 2008-037561 A | 2/2008 |
| KR | 10-2006-0066923 A | 6/2006 |
| KR | 10-2009-0076710 A | 7/2009 |

OTHER PUBLICATIONS

International Search Report dated Apr. 27, 2011 of corresponding International PCT Application No. PCT/US2010/047478, filed Sep. 1, 2010.

* cited by examiner

*Primary Examiner* — Daniel Previl
(74) *Attorney, Agent, or Firm* — Pearne & Gordon LLP

(57) ABSTRACT

An RFID tag monitoring system with multiple reader units each equipped with processing capacity sufficient to enable the unit to operate autonomously under its own command and control as well as to register in its individual memory the identity of all of the items that potentially could be present at any particular time at a zone or zones to which it is assigned as well as the particular zone at which a specific RFID tagged item is found; data compression at the reader units permits timely reporting of inventory to a main computer.

30 Claims, 3 Drawing Sheets

RFID TAG MONITORING SYSTEM

This application claims the priority of U.S. Provisional Application No. 61/244,951, filed Sep. 23, 2009.

BACKGROUND OF THE INVENTION

The invention relates to radio frequency identification, RFID, and, more specifically, to a RFID based system for monitoring inventory or the presence of goods at a site.

PRIOR ART

RFID tags, readers, and antennas are currently being used and being developed as tools to keep track of inventory of goods at specific sites such as retail stores, warehouses, and the like. In some situations, it is desirable to identify and track goods on an item level basis. It is further desirable that the inventory data for all of the goods at a site be stored in a main or host computer at the site or at a remote location.

A difficulty exists where it is desired to have inventory data available on a real time or nearly instantaneous basis. Where the inventory of goods is extensive and the goods are to be tracked on an item level basis, current systems require massive amounts of data to be transmitted from numerous readers to a main computer. A bottleneck can exist at the main computer where the readers attempt to identify all of the tagged items simultaneously or serially to the main computer.

It can be demonstrated that at a retail store of moderate size, for example, conventional RFID reading and data reporting techniques can take an impractical length of time to transmit all of the inventory data to a main computer.

SUMMARY OF THE INVENTION

The invention involves a system and method which monitors the physical inventory or presence of goods at a site on a real time basis, i.e. nearly instantaneously. Item level data including the precise zone address of an item at a site is made available to a main computer or server at or remote from the site. The result is accomplished, in accordance with the invention, by dividing the space of a site into a plurality of zones and assigning an individual RFID reader unit to one or a limited number of zones. The reader units are preferably equipped with processing capacity sufficient to enable the unit to be under its own command and control as well as to register in its individual memory the identity of all of the items that potentially could be present at any particular time at a zone or zones to which it is assigned as well as the particular zone at which a specific RFID tagged item is found.

In one preferred mode of operation of the system, the reader units report the full inventory of RFID tagged items located in their respective domains to the main computer only intermittently, but serve to continuously update inventory data with a data compression technique of reporting only items added or removed from a zone. Desirably, the appearance or departure of items along with the actual zone an item is placed in or removed from is monitored. The disclosed data compression techniques greatly reduce the data being sent through a network connecting numerous reader units to the main computer. A bottleneck in inventory data reception at the main computer is thereby eliminated and the data available at the main computer is current.

The system complexity is reduced by normally allowing the reader units to operate autonomously and to communicate with the main computer through a wired connection such as an Ethernet connection or a wireless connection. The system can enable the main computer to maintain a current record of all of the inventory located at the site and the precise zone location of any inventoried item. Moreover, the system is sufficiently responsive to actually track movement of an item throughout a monitored site.

DESCRIPTION OF A PREFERRED EMBODIMENT

Figure 1:
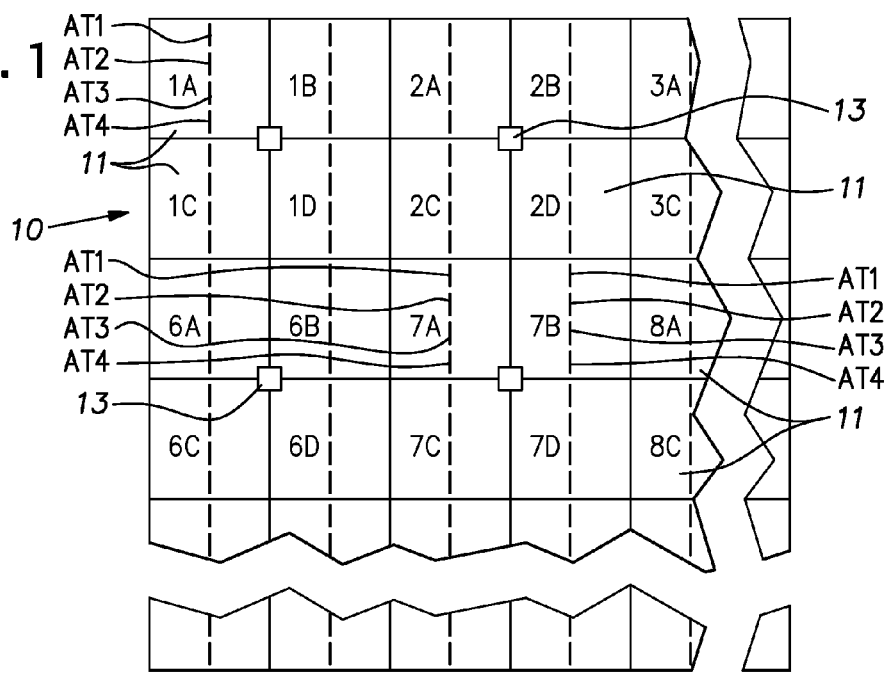
FIG. 1 is a schematic diagram of a site divided into zones monitored by a RFID system constructed in accordance with the invention.
Figure 2:
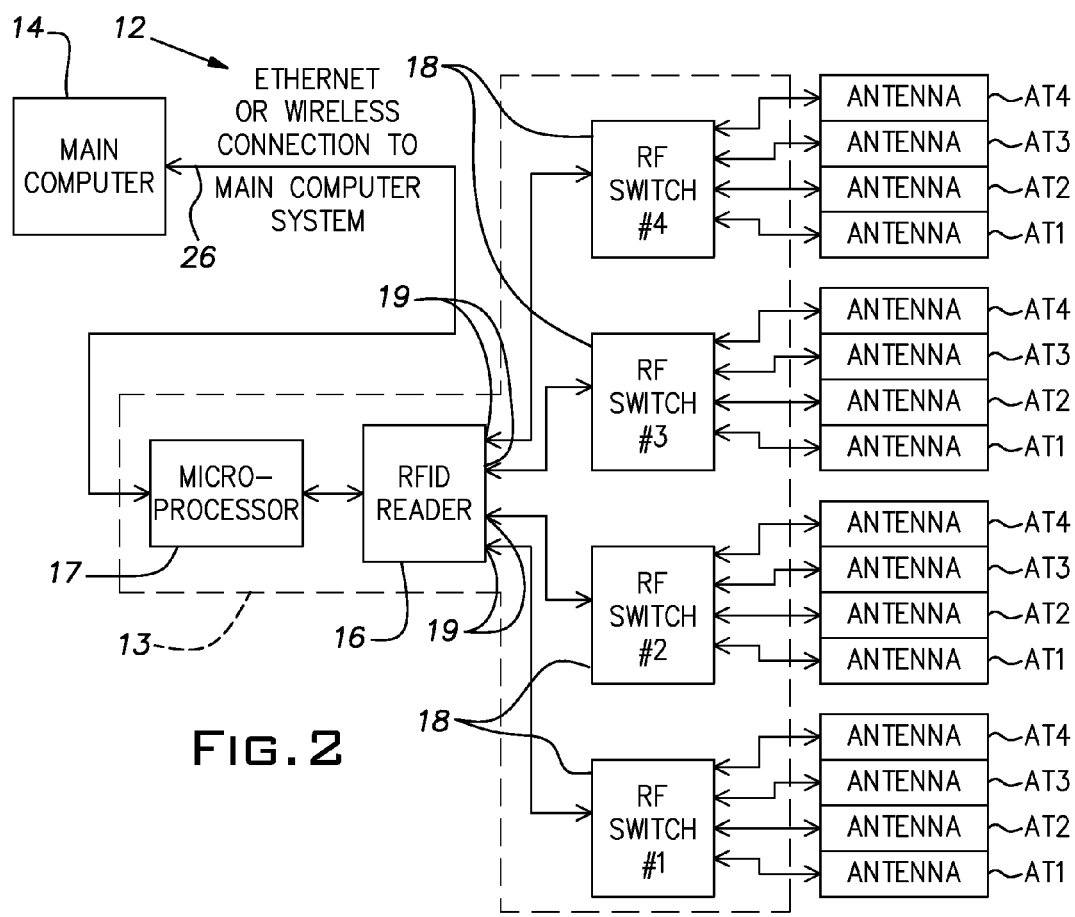
FIG. 2 is a schematic diagram of a representative portion of the RFID system of FIG. 1 in accordance with further details of the invention.

A site 10 representing a location at which goods are received or produced and from which they are distributed can be, for example, an enclosed building. The site is divided into zones 11 that in the illustrated arrangement are contiguous with each other. The presence of RFID tagged goods, preferably on an item level and on a zone-by-zone basis, is monitored by a system 12 that includes a plurality of RFID reader units 13. As described below, the reader units 13 report data to a common main computer or server 14 which records inventory data which can be accessed for display or query by personnel on site or at a remote location as well as for other business purposes. The site 10 can be a retail establishment, for example, where each item of goods received there for sale bears a unique RFID tag.

The RFID reader units 13 in the illustrated case are identical and are each an assembly of a RFID reader 16, microprocessor 17, and a RF (radio frequency) switch 18. The reader 16, microprocessor 17, and RF switches 18 are commercially available and generally known in the industry. It will be understood by those skilled in the art that the processing capability of the microprocessor 17 and/or the RF switches 18 may be incorporated into the original manufacture of the reader itself if desired. The illustrated readers 16 each have four reader ports with each port being served by a separate RF switch 18. Where the RF switches 18 are separate components, as shown, they are controlled by any communication port such as the PIO (parallel input and output) port of the associated reader.

Each RF switch 18 has four separate antenna channels for connection to the associated reader port, each channel being connected to an associated separate antenna AT1-AT4. Thus, in the illustrated embodiment, each reader 16 operates sixteen antennas. Preferably, each reader port 19 and the four antennas AT1-AT4 associated with it through a common RF switch 18 is dedicated to a separate single zone 11.

An antenna typically will have a coverage range that can be defined as that distance at which at least ½ of the RFID tags having random orientations will be read by the antenna. When the site 10 is divided into zones 11, the dimensions of a zone should not exceed the coverage range of the antennas being used.

To reduce fading problems at a zone, multiple antennas are used and are preferably positioned with multiple spatial diversities. Multiple spatial diversities can be achieved by locating the antennas at different positions in a three dimensional space. For spatial diversity, the spacing between two antennas should be at least ¼ wavelength. For multiple spatial diversities the spacing between antennas forming at least two pairs should be at least ¼ wavelength. Where the antennas have a length, orientation diversity can also be achieved by aligning the length in different angular directions. For orientation diversity, the angle between the two antennas should be at least 30°. For multiple orientation diversities, the angle between antennas forming at least two should be at least 30°. A combination of spatial diversity of a pair of antennas and orientation diversity of a pair of antennas can, likewise, develop sufficient multiple diversities to effectively reduce fading.

In the present arrangement in each zone, four elongated antennas AT1-AT4 are spaced from one another along a medial vertical plane of the zone in a vertical orientation with alternate antennas elevated relative to intervening horizontally-displaced antennas. The resulting horizontal and vertical spatial diversity is sufficient to assure that 99.9% of the RFID tags in the zone will be illuminated and detected. By way of example, a zone 11 can be a space bounded by a 10'×10' floor area, and a shelf or ceiling height of 10' in a typical retail store.

The readers 16 are physically situated near their assigned zones 11, i.e. generally within about 15 to 20 feet. The associated microprocessor 17 which, if not integrated in the reader console, is within a few feet of it to make high-speed data transfer practical. Each microprocessor 17 is in continuous command and control of its associated reader 16 and such command and control is preferably normally exclusive of the main computer 14. Each microprocessor 17 of a reader unit 13 communicates with the main or central computer 14 preferably on a wired or wireless network, diagrammatically illustrated by a line 26, with the other microprocessors such as with an Ethernet network. Each reader 16 has its PIO port wired to control its four RF switches 18 enabling it to select a channel, and therefore a particular antenna AT, under a command from its associated microprocessor 17.

Each reader 16, under the control of its microprocessor 17, successively drives its antennas AT1-AT4 associated with each of its ports 19 in a sequence described below. The antennas AT each detect RFID tags on items in their associated zone. The signals off of the tags picked up by the antennas AT are decoded by the reader 16 to establish the presence and unique identity of a tagged item. Data identifying a tagged item is continuously and repeatedly transmitted to the microprocessor 17 by the reader 16 with the identity of the active port 19, and therefore the zone associated with the antenna picking up the tag signal, being known to the microprocessor. The microprocessor knowing the port and therefore the zone supplying the RFID tag data operates to record in its electronic memory the identifying data of an item and the zone in which the item is found. This tag information collected for a particular zone can be labeled the zone inventory data. The reader 16 as is typical of conventional present day readers continuously and repeatedly drives its associated antennas, receives RFID tag data, decodes the data to identify an item, and transmits this identifying data, typically many times over in a given cycle of antenna operation.

It can be demonstrated that at even moderately sized retail sites, numerous readers will generate massive amounts of inventory data.

The present invention involves the insight of processing the reader-derived data at the fringe or perimeter of the network where the readers reside and before it is transmitted to a main computer for developing site-wide or storewide inventory data. As explained below, this allows RFID inventory data to be compressed in different techniques before being transmitted to a main computer. This data compression can reduce actual data transmission by orders of magnitude.

The system 12 can be programmed to operate in a variety of modes and sequences. In a basic mode, the main computer 14 directs each microprocessor 17, through their network connections, to autonomously drive their readers 16 to activate their respective antennas and allow each microprocessor to process reader generated data and develop separate RFID tag inventory data for each zone associated with a particular reader. When so instructed by the main computer 14, the reader units 13 operate autonomously and without synchronization with other reader units and report their respective zone inventory data to the main computer through their network connection.

Figure 3A:
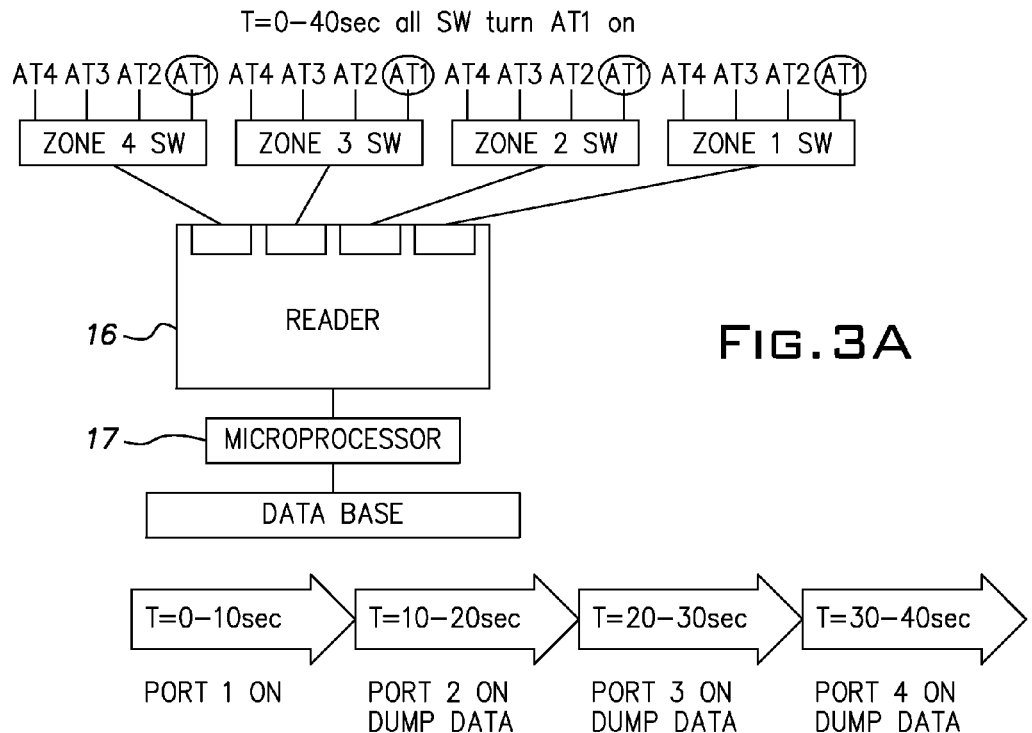
FIGS. 3A-3D diagrammatically depict successive operations of a typical RFID reader unit.
Figure 3B:
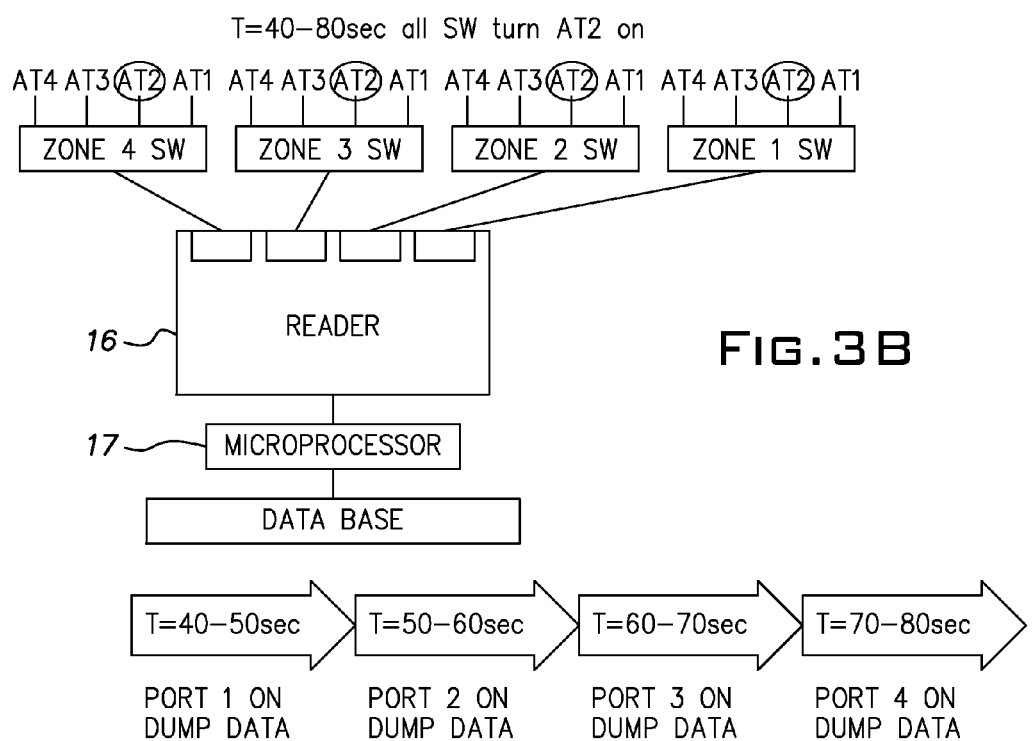
Figure 3C:
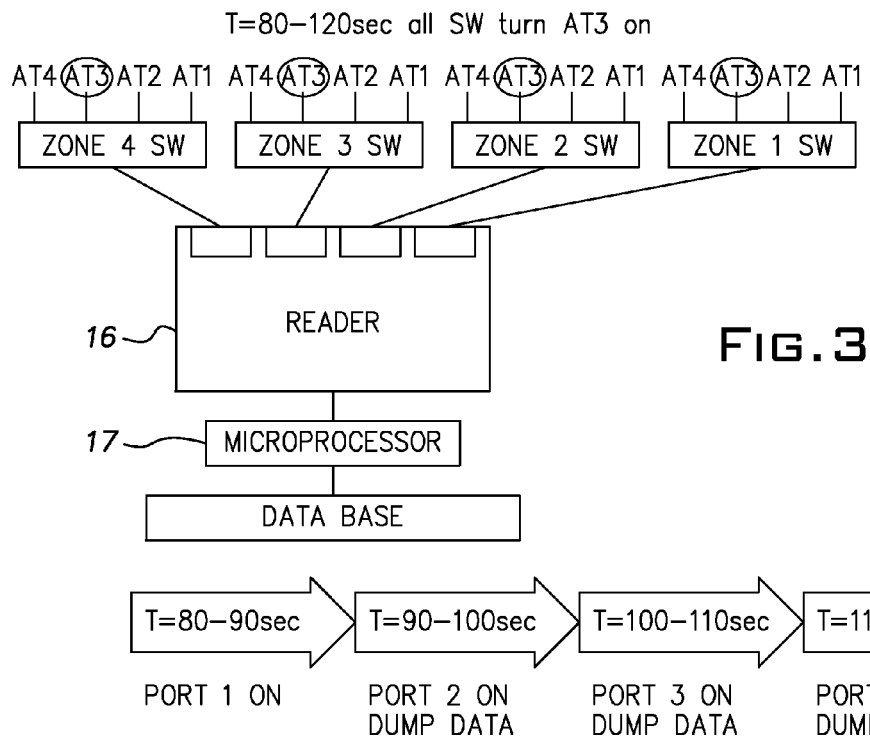
Figure 3D:
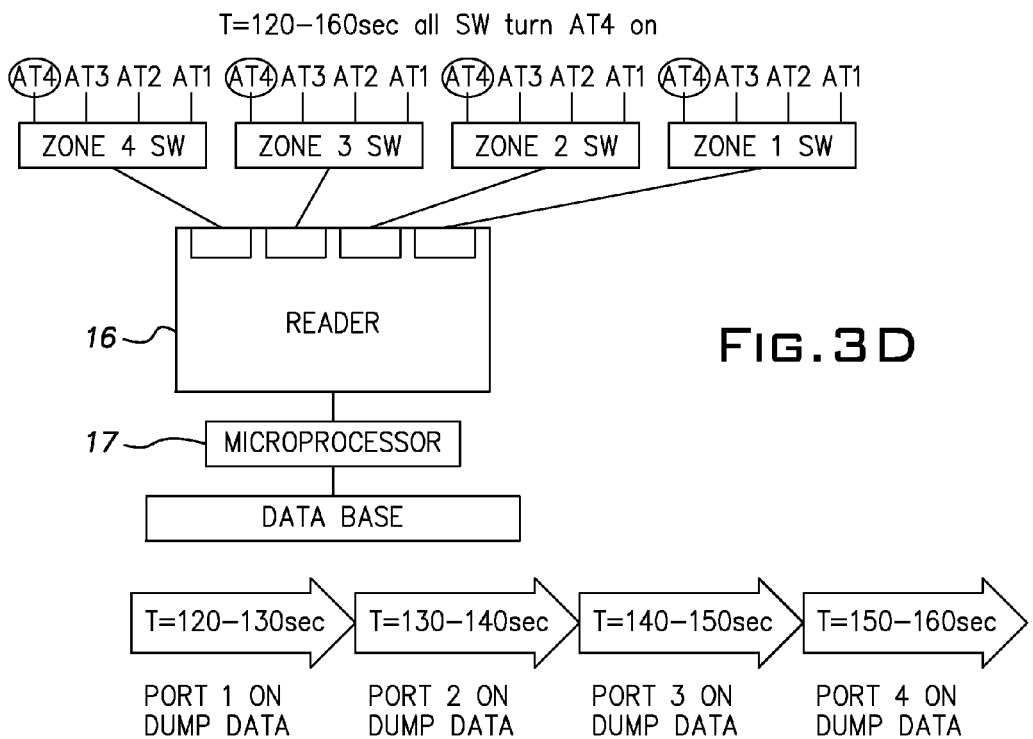

The timing of data collection and data processing, shown diagrammatically in FIGS. 3A-3D, is now described.

1) The RF switches 18 are controlled by the reader PIO, (parallel input output port, not shown) which is connected in parallel to all the RF switches 18 of the specific reader 16 such that they all switch to the same switch output or antenna channel at the same time.

2) Assuming that all the RF switches of the specific reader are commanded to switch to antenna AT1, command and control of the reader described below is by the associated microprocessor 17.

3) The reader is commanded to read the tagged inventory for a set time through its port #1, which is connected through the RF switch to its antenna AT1. This data is collected in the microprocessor memory through a DMA, direct memory access, transfer.

4) The reader 16 is then commanded by its microprocessor to read the tagged items or inventory for a set time through its port #2. As the port #2 data is being collected, the microprocessor takes the port #1 data and processes it to create an inventory set that is defined as port #1 or zone #1 inventory.

5) The reader 16 is then commanded to read the tagged inventory for a set time through port #3. As the port #3 data is being collected, the microprocessor takes the port #2 data and creates an inventory data set that is defined as port #2 or zone #2 inventory.

6) The reader is then commanded to read the tagged inventory for a set time through port #4. As the port #4 data is being collected, the microprocessor takes the port #3 data and creates an inventory data set that is defined as port #3 or zone #3 inventory.

7) The microprocessor then commands the RF switch to connect to antenna AT2 through output #2.

8) The reader is then commanded to read the tagged inventory for a set time through port #1. As the port #1 data is being collected, the microprocessor takes the port #4 data and creates an inventory data set that is defined as port #4 or zone #4 inventory.

9) The reader is then commanded to read the tagged inventory for a set time through port #2. As the port #2 data is being collected, the microprocessor takes the port #1 data and creates an inventory data set that is defined as port #1 or zone #1 inventory. Note that this new inventory data coming from port #1 represents the second antenna data from zone #1. Thus, this second antenna data is added to the previous zone #1 data obtained earlier for the first antenna in zone #1. Therefore, this zone #1 data now represents the inventory obtained with the first and second antennas.

10) The reader is then commanded to read the tagged inventory for a set time through port #3. As the port #3 data is being collected, the microprocessor takes the port #2 data and creates an inventory data set that is defined as port #2 or zone #2 inventory. Note that this new inventory data coming from port #2 represents the second antenna data from zone #2. Thus, this second antenna data is added to the previous zone #2 data obtained earlier for the first antenna in zone #2. Therefore, this zone #2 data now represents the inventory obtained with the first and second antennas.

11) The reader is then commanded to read the tagged inventory for a set time through port #4. As the port #4 data is being collected, the microprocessor takes the port #3 data and creates an inventory data set that is defined as port #3 or zone #3 inventory. Note that this new inventory data coming from port #3 represents the second antenna data from zone #3. Thus, this second antenna data is added to the previous zone #3 data obtained earlier for the first antenna in zone #3. Therefore, this zone #3 data now represents the inventory obtained with the first and second antennas.

12) The RF switch is then commanded to switch to output #3.

13) The reader is then commanded to read the tagged inventory for a set time through port #1. As the port #1 data is being collected, the microprocessor takes the port #4 data and creates an inventory data set that is defined as port #4 or zone #4 inventory. Note that this new inventory data coming from port #4 represents the second antenna data from zone #4. Thus, this second antenna data is added to the previous zone #4 data obtained earlier for the first antenna in zone #4. Therefore, this zone #4 data now represents the inventory obtained with the first and second antennas AT1 and AT2.

14) The reader is then commanded to read the tagged inventory for a set time through port #2. As the port #2 data is being collected, the microprocessor takes the port #1 data and creates an inventory data set that is defined as port #1 or zone #1 inventory. Note that this new inventory data coming from port #1 represents the third antenna data from zone #1. Thus, this third antenna data is added to the previous zone #1 data obtained earlier for the first and second antennas in zone #1. Therefore, this new zone #1 data now represents the inventory obtained with the first, second and third antennas in zone #1.

15) This process is continued until all the antenna inventories are collected for each port or zone. Therefore, the microprocessor will have a complete inventory for each port or zone using each of the four antennas in all the zones. As a result, the microprocessor sends this zone data to the main or store inventory computer using a standard computer-to-computer network protocol. In the meantime, the microprocessor simply continues to collect data by cycling through the previous steps.

16) Using this approach the microprocessor is controlling the whole process. In other words, the inventory data is not collected until the microprocessor causes the RF switch to be in a position that corresponds to a sequence governed by the microprocessor.

Alternatively to the just described process, a reader unit 13, particularly if it is fast and of adequate capacity can collect all of the available data and then process it. Regardless of the sequence or strategy of data collection and processing, the process performed by the reader unit 13 is preferably conducted autonomously such that it is ordinarily free of direct control by the main computer 14. At the same time, all of the other reader units 13 are performing the same process to monitor the inventory in their respective zones. Operation of the various reader units 13 at the site 10 covering its numerous zones 11 while being done simultaneously is preferably not synchronized. When a microprocessor 17 determines that its inventory data is accurate, it can report the results to the main computer 14.

A microprocessor can identify a potential antenna problem or failure. This is relatively easy to accomplish using the previous described software. If an antenna starts to fail or fails, the tagged items collected will be far short of the previous data collection set. If this happens, it must be assumed that an antenna could be failing intermittently or has failed completely. Thus, error codes are created as part of the normal processing loop and this error data is sent with the data file going to the main computer. The main computer software can then decode the error and identify the specific microprocessor unit that has the potential problem.

In terms of the mode control, this can be done through the main or store host computer. It simply sends an appropriate command-and-control file to the microprocessor. As the microprocessor completes each new processing cycle through all the antennas, it first checks to see if a new command and control file has been received. If so, it acknowledges that this file has been received and immediately changes modes. Thus, the next processing loop will be performed under the new mode. Examples of modes are a full inventory data set or a data set of items added or removed from the zones monitored by the particular reader unit since the last full inventory data set report.

In a conventional manner, the readers 16 operate continuously and repeatedly identify RFID tagged items ultimately for submission to the central computer. Tag or item information or data includes, for example, the tag number, the time the tag was read and relative signal power received from the tag. With adequate processing capacity located at the reader, as contemplated by the present invention, obtained with a separate microprocessor 17 for each reader 16 or integration of such processing capacity in the reader itself, the stream of data coming off the reader is advantageously processed locally at the site of the reader (i.e. within a few feet of or integrated with the reader) and compressed into an actual zone inventory, i.e. a list of unique tag numbers without duplication, and the zone where they are indicated to be present. Having this information developed locally by the microprocessor very near where the goods exist is a great advantage afforded by the invention.

Assuming that, at some time, the central computer has received the complete inventory data set for each zone which data collectively represents the full site inventory, it is only necessary to inform the central computer when there has been a change at any zone resulting from addition or removal of items at a zone. Data reflecting a change of a limited number of items added or removed is typically miniscule in comparison to the data identifying the full inventory of a zone or zones. Only the compressed data reflecting a change at a zone need be communicated to the main computer during ordinary business hours, for example.

To summarize, once the system 12 is operational and all of the RFID tagged items in all of the zones have been entered in a site inventory, the aforementioned data compression techniques can be employed so that only a limited amount of data is sent to the main computer via the network from all of the reader units 13. The network, such as by the Ethernet protocol, resolves conflicts or collisions of data being sent from the microprocessors 17 to the main computer 14 and the compressed state of the data avoids bottlenecks which might otherwise occur and slow the delivery of current useful data. The system is responsive enough to track movement of an item from zone to zone. Moreover, a query to the main computer will reveal the zone location of any item in the site inventory. The main computer can direct the reader units to send complete updated zone inventory data sets during periods of low activity at the site, such as in the middle of the night, for improved inventory accuracy.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An RFID tag monitoring system comprising a main computer, a plurality of RFID reader units and a plurality of RFID antennas connected to the reader units, the reader units being located near an associated zone or zones where RFID tagged items are expected to be present and being connected to the main computer by a network, each of said readers being operably connected to at least one antenna, each antenna being arranged to illuminate and detect RFID tags in an associated one of said zones, the reader units each having electronic processing capacity and memory for and being programmed to process signals from RFID tags detected by an associated antenna to an inventory data file stored in said reader unit and to transmit said inventory data file to the main computer through said network.

2. An RFID tag monitoring system as set forth in claim 1, wherein each of said reader units has sufficient processing capacity and is programmed to identify RFID tagged items added or removed to determine changes over time in an associated zone.

3. An RFID tag monitoring system as set forth in claim 2, wherein each of said reader units has sufficient processing capacity and is programmed to identify to the main computer, from time-to-time, only items added or removed from an associated zone.

4. An RFID tag monitoring system as set forth in claim 1, wherein each reader unit has capacity and is programmed to record and transmit to the main computer the identity of the zone in which an RFID tagged item is indicated to have been added or from which an RFID tagged item is indicated to have been removed.

5. An RFID tag monitoring system as set forth in claim 1, wherein each reader unit monitors a plurality of zones through connection with a plurality of antennas.

6. An RFID tag monitoring system as set forth in claim 5, wherein each zone is illuminated by a plurality of antennas arranged with multiple spatial diversities.

7. An RFID tag monitoring system as set forth in claim 5, wherein each zone is illuminated by a plurality of antennas arranged with multiple orientation diversities.

8. An RFID tag monitoring system as set forth in claim 5, wherein each reader unit has a plurality of ports, and each port is associated with a unique zone.

9. An RFID tag monitoring system as set forth in claim 8, wherein each reader unit has an associated RF switch controlled by the reader unit, each RF switch being arranged to selectively couple one of a plurality of antennas to the reader unit, each RF switch and the associated antennas being assigned to a single RFID tagged item receiving zone.

10. An RFID tag monitoring system comprising a main computer and a plurality of RFID tag reader units communicating with the main computer with a common network, each reader unit having multiple ports with each port assigned to a separate zone of space, at least one antenna being assigned to each port and the zone associated with the port, each reader unit having an associated processor arranged to store the identity of all of the RFID tagged items located in the zones associated with the reader unit's ports including, for each item, the zone of the antenna locating the item.

11. An RFID tag monitoring system as set forth in claim 10, wherein the reader unit is programmed to autonomously report to the main computer the inventory of RFID tagged items and the identity of the zone at which each item is located.

12. An RFID tag monitoring system as set forth in claim 10, wherein the main computer and reader units are in a wired network.

13. An RFID tag monitoring system as set forth in claim 12, wherein the network is an Ethernet network.

14. An RFID tag monitoring system as set forth in claim 10, wherein the main computer and reader units are in a wireless network.

15. An RFID tag monitoring system as set forth in claim 10, wherein the reader units are each programmed to produce a limited report to the main computer of the identity of items added or removed from its associated zones.

16. An RFID tag monitoring system as set forth in claim 10, wherein each reader unit has a plurality of antennas for each zone.

17. An RFID tag monitoring system as set forth in claim 16, wherein said antennas are arranged to provide multiple spatial diversities.

18. An RFID tag monitoring system as set forth in claim 16, wherein said antennas are arranged to provide multiple orientation diversities.

19. An RFID tag monitoring system as set forth in claim 16, wherein the antennas of each port of each reader unit are operated through an RF switch controlled by the reader unit.

20. A method of monitoring a space for the presence of RFID tagged items comprising dividing the space into a plurality of zones, locating an RFID reader unit in proximity to each zone, the RFID reader units being provided with data processing capacity and a port connected to a plurality of antennas, positioning at least one antenna to read RFID tags in an associated one of said zones, operating the antenna or antennas of each zone through a respective reader port, receiving RFID tag data from each antenna, decoding the RFID tag signals to identify the number of the tag present in each zone, and storing in memory of the reader unit the tag information and indicated zone location of tags.

21. A method as set forth in claim 20, wherein a reader is provided with multiple ports, each port being assigned to a separate zone.

22. A method of monitoring a space as set forth in claim 21, wherein the reader units are programmed to report the identify of RFID tagged items added or removed from their respective zones separately from a full report of all of the RFID tagged item inventory present in the respective zones at a particular time.

23. A method of monitoring the presence of RFID tagged items at a space, comprising connecting a main computer and a plurality of RFID reader units in a common network, providing each reader unit with sufficient processing capacity for independent self command and control, connecting each reader unit to at least one antenna exclusive of the other readers and arranged to survey an associated zone that is part of the space being monitored, operating each reader unit and a respective antenna to detect the presence of RFID tags in the zone to which the antenna is associated, decoding RFID signals from the RFID tags in the associated zone to item data, storing the detected item data in memory to form an inventory of items and from time-to-time sending the inventory data to the main computer.

24. A method as set forth in claim 23, wherein the reader units operate autonomously.

25. A method as set forth in claim 24, wherein each reader unit is free of synchronization with the operation of other reader units.

26. A method as set forth in claim 23, including providing the reader units with a processing capacity and program to determine changes from time-to-time in the inventory data representing additions or removal of items from an associated zone and reporting the same to the main computer.

27. A method of monitoring the presence of RFID tags at a site comprising selecting antennas having a coverage range of a distance at which at least ½ of the RFID tags having random orientations are read for use at the site, dividing the site into zones having dimensions less than the coverage range of the selected antennas, at each zone locating a plurality of the selected antennas and successively driving each of the antennas with a common reader to collect data from RFID tags located in a zone.

28. A method as set forth in claim 27, wherein the antennas in a zone are located with multiple spatial diversities.

29. A method as set forth in claim 28, wherein the antennas in a zone are aligned with multiple orientation diversities.

30. A method as set forth in claim 27, wherein the antennas in a zone are aligned with multiple orientation diversities.

* * * * *